US011401134B2

(12) United States Patent
Tang (10) Patent No.: US 11,401,134 B2
(45) Date of Patent: Aug. 2, 2022

(54) ELEVATOR CALLING OPERATION BASED ON WRIST WEARABLE SMART DEVICE

(71) Applicant: Otis Elevator Company, Farmington, CT (US)

(72) Inventor: XiaoBin Tang, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1265 days.

(21) Appl. No.: 15/491,288

(22) Filed: Apr. 19, 2017

(65) Prior Publication Data
US 2017/0305715 A1    Oct. 26, 2017

(30) Foreign Application Priority Data

Apr. 21, 2016 (CN) .................... 201610249602.X (51) Int. Cl.
*B66B 1/46* (2006.01)
*B66B 1/34* (2006.01)
(Continued)

(52) U.S. Cl.
CPC ............ *B66B 1/468* (2013.01); *B66B 1/3461* (2013.01); *G06F 3/015* (2013.01); *G06F 3/0346* (2013.01);
(Continued)

(58) Field of Classification Search
USPC ........................................................ 187/381
See application file for complete search history.

(56) References Cited

U.S. PATENT DOCUMENTS 6,223,160 B1    4/2001    Kostka et al.
7,936,249 B2    5/2011    Friedli
(Continued)

FOREIGN PATENT DOCUMENTS

CN    101058381 A    10/2007
CN    103508274 A     9/2015
(Continued)

OTHER PUBLICATIONS

European Search Report for application EP 17167625.7, dated Jan. 30, 2018, 11 pages.

*Primary Examiner* — Christopher Uhlir
(74) *Attorney, Agent, or Firm* — Cantor Colburn LLP (57) ABSTRACT

An elevator calling operation based on a wrist-wearable smart device. An elevator calling operation system of the present invention comprises: an elevator control apparatus, and a wrist-wearable smart device wirelessly connected to the elevator control apparatus, wherein the wrist-wearable smart device comprises an identity identification module which stores identity identification information about a passenger, and a motion sensor which is used for acquiring elevator calling motion information about the passenger performing an elevator calling operation, and the wrist-wearable smart device transmits the elevator calling motion information, in association with the identity identification information, to the elevator control apparatus; and the elevator control apparatus comprises: a passenger identity recognition module and an elevator calling operation recognition module, the elevator calling operation recognition module used for recognizing the elevator calling operation of the passenger according to the elevator calling motion information from the motion sensor.

35 Claims, 3 Drawing Sheets

(51) Int. Cl.
*H04W 4/80* (2018.01)
*G06F 3/01* (2006.01)
*G06F 3/0346* (2013.01)

(52) U.S. Cl.
CPC ......... *H04W 4/80* (2018.02); *B66B 2201/104* (2013.01); *B66B 2201/405* (2013.01); *B66B 2201/4653* (2013.01); *B66B 2201/4669* (2013.01); *B66B 2201/4676* (2013.01)

(56) References Cited

U.S. PATENT DOCUMENTS

| | | | |
|---|---|---|---|
| 8,960,373 | B2 | 2/2015 | De Vincentis |
| 9,174,823 | B2 | 11/2015 | Tokura |
| 2006/0259777 | A1 | 11/2006 | Izawa |
| 2008/0011557 | A1 | 1/2008 | Hakala et al. |
| 2010/0315208 | A1 | 12/2010 | Takeuchi |
| 2013/0116835 | A1 | 5/2013 | Nowel |
| 2013/0175121 | A1 | 7/2013 | Hanninen et al. |
| 2013/0194066 | A1 | 8/2013 | Rahman et al. |
| 2014/0237229 | A1 | 8/2014 | Rosenblatt |
| 2014/0321719 | A1 | 10/2014 | Newman et al. |
| 2014/0337621 | A1 | 11/2014 | Nakhimov |
| 2015/0034426 | A1 | 2/2015 | Armistead |
| 2015/0068849 | A1* | 3/2015 | Haipus .................... B66B 1/468 187/384 |
| 2015/0314983 | A1 | 11/2015 | Saari et al. |
| 2018/0222716 | A1* | 8/2018 | Raitola ................... B66B 3/006 |

FOREIGN PATENT DOCUMENTS

| | | |
|---|---|---|
| CN | 105160455 A | 12/2015 |
| CN | 105540361 B | 11/2017 |
| WO | 2015119620 A1 | 8/2015 |
| WO | 2015157670 A1 | 10/2015 |
| WO | 2016014313 A1 | 1/2016 |

\* cited by examiner

ELEVATOR CALLING OPERATION BASED ON WRIST WEARABLE SMART DEVICE

PRIORITY

This application claims priority to Chinese Patent Application No. 201610249602.X, filed 21 Apr. 2016, and all the benefits accruing therefrom under 35 U.S.C. § 119, the contents of which in its entirety are herein incorporated by reference.

TECHNICAL FIELD

The present invention falls within the technical field of elevator control, and relates to an elevator calling operation based on a wrist-wearable smart device, and in particular, to an elevator calling operation system capable of recognizing which passenger initiates an elevator calling request for an elevator calling operation as well as an elevator control apparatus used thereby, a wrist-wearable smart device and an elevator calling operation method.

BACKGROUND ART

There are mainly two management methods for the current elevator calling operations on an elevator, among which one is that passengers may perform an elevator calling operation freely to send an elevator calling request command of going to a certain floor or in a certain direction (for example, upwards or downwards), and another is that an elevator administrator gives an IC card to the corresponding passenger, and only passengers with the IC card can perform an elevator calling operation and send an elevator calling request command. The second method above can prevent foreign irrelevant people from freely taking the elevator; however, the way of performing elevator calling using the IC card cannot recognize which passenger initiates an elevator calling request for the elevator calling operation, and it is also inconvenient to carry the IC card, and the elevator calling operation is thus inconvenient.

SUMMARY

In order to solve the above or other technical problem in the prior art, the present invention provides the following technical solutions.

According to one aspect of the present invention, an elevator calling operation system is provided, the elevator calling operation system comprising: an elevator control apparatus, and a wrist-wearable smart device wirelessly connected to the elevator control apparatus;

the wrist-wearable smart device comprising:

an identity identification module which stores identity identification information about a passenger; and a motion sensor which is used for acquiring elevator calling motion information about the passenger performing an elevator calling operation;

wherein the wrist-wearable smart device is configured to transmit the elevator calling motion information, in association with the identity identification information, to the elevator control apparatus;

and the elevator control apparatus comprising:

a passenger identity recognition module which is used for recognizing passenger identity information at least according to the identity identification information; and an elevator calling operation recognition module which is used for recognizing an elevator calling operation of the passenger according to the elevator calling motion information from the motion sensor, so as to make an elevator calling request for the elevator calling operation correspond to the recognized passenger identity information.

The elevator calling operation system according to an embodiment of the present invention, wherein the elevator calling operation recognition module is further configured to determine, according to the elevator calling motion information from the motion sensor, the number of times of an elevator calling operation by the same passenger, and ignore, according to the number of times of the elevator calling operation, unnecessary elevator calling requests of the passenger.

In one embodiment, the elevator calling operation recognition module is further configured to determine, according to the elevator calling motion information from the motion sensor, the number of times of an elevator calling operation by the same passenger, and judge, according to the number of times of the elevator calling operation, whether to provide a special dispatch service.

The elevator calling operation system according to an embodiment of the present invention, wherein the elevator calling operation recognition module is further configured to provide the passenger with the special dispatch service of priority dispatching when the number of times of the elevator calling operation by the same passenger is greater than or equal to a certain pre-set value.

The elevator calling operation system according to an embodiment of the present invention, wherein the passenger identity recognition module is further configured to judge, based on the identity identification information or passenger identity information, whether to authorize the passenger to make an elevator calling request.

The elevator calling operation system according to an embodiment of the present invention, wherein the elevator control apparatus is further configured to judge, based on the recognized passenger identity information, whether to provide the passenger with a customized service.

The elevator calling operation system according to an embodiment of the present invention, wherein the customized service comprises assigning a dedicated elevator to the passenger, wherein the dedicated elevator at least does not accept, on an elevator riding path from an initial floor to a destination floor of the passenger, an elevator calling request with the same elevator riding direction from other passengers going from the initial floor to the destination floor.

The elevator calling operation system according to an embodiment of the present invention, wherein the elevator control apparatus and the wrist-wearable smart device are wirelessly connected by Bluetooth or near field communication or radio-frequency wireless communication, wherein when the passenger performs an elevator calling operation, a wireless connection is automatically established between the elevator control apparatus and the wrist-wearable smart device.

The elevator calling operation system according to an embodiment of the present invention, wherein the wrist-wearable smart device further comprises a biological characteristic information collection module which is used for collecting biological characteristic information about the passenger; and the elevator control apparatus further comprises a passenger physical status detection module which acquires, at least according to the biological characteristic information from the biological characteristic information collection module, physical status information about the corresponding passenger, so as to judge whether to initiate the corresponding special service.

In one embodiment, the passenger physical status detection module is further configured to judge, at least according to the physical status information about the passenger, whether the passenger has diseases that need rescue, and automatically initiate the special service triggering a rescue service request when it is judged to be "yes".

In one embodiment, the passenger physical status detection module is further configured to acquire or receive other motion information collected by the motion sensor apart from the elevator calling motion information, and judge, based on the other motion information, whether the corresponding passenger has the diseases that need rescue.

In one embodiment, the passenger identity recognition module is further configured to acquire or receive the biological characteristic information collected by the biological characteristic information collection module and perform, based on the biological characteristic information, identity authentication on the recognized passenger identity information.

In one embodiment, the biological characteristic information comprises heart rate, blood pressure, body temperature, oxygen content of blood and/or vein distribution characteristic information.

In the elevator calling operation system according to any of the foregoing embodiments, the wrist-wearable smart device is a smart band.

In the elevator calling operation system according to any of the foregoing embodiments, the motion sensor comprises an acceleration sensor and/or a gyroscope.

According to another aspect of the present invention, an elevator control apparatus is provided, configured to be capable of establishing a wireless connection with a wrist-wearable smart device worn by a passenger, and acquiring or receiving identity identification information about the passenger, in association with elevator calling motion information when the passenger performs an elevator calling operation, from the wrist-wearable smart device;

wherein the elevator control apparatus comprises:

a passenger identity recognition module which is used for recognizing passenger identity information at least according to the identity identification information; and an elevator calling operation recognition module which is used for recognizing an elevator calling operation of the passenger according to the elevator calling motion information, so as to make an elevator calling request for the elevator calling operation correspond to the recognized passenger identity information.

The elevator control apparatus according to an embodiment of the present invention, wherein the elevator calling operation recognition module is further configured to determine, according to the elevator calling motion information, the number of times of an elevator calling operation by the same passenger, and ignore, according to the number of times of the elevator calling operation, unnecessary elevator calling requests of the passenger.

In one embodiment, the elevator calling operation recognition module is further configured to determine, according to the elevator calling motion information, the number of times of an elevator calling operation by the same passenger, and judge, according to the number of times of the elevator calling operation, whether to provide a special dispatch service.

In one embodiment, the elevator calling operation recognition module is further configured to provide the passenger with the special dispatch service of priority dispatching when the number of times of the elevator calling operation by the same passenger is greater than or equal to a certain pre-set value.

The elevator control apparatus according to an embodiment of the present invention, wherein the passenger identity recognition module is further configured to judge, based on the identity identification information or passenger identity information, whether to authorize the passenger to make an elevator calling request.

The elevator control apparatus according to an embodiment of the present invention, wherein the elevator control apparatus is further configured to judge, based on passenger information in an elevator calling request corresponding to the recognized passenger, whether to provide the passenger with a customized service.

In one embodiment, the customized service comprises assigning a dedicated elevator to the passenger, wherein the dedicated elevator at least does not accept, on an elevator riding path from an initial floor to a destination floor of the passenger, an elevator calling request with the same elevator riding direction from other passengers going from the initial floor to the destination floor.

The elevator control apparatus according to an embodiment of the present invention, wherein the elevator control apparatus and the wrist-wearable smart device are wirelessly connected by Bluetooth or near field communication or radio-frequency wireless communication, wherein when the passenger performs an elevator calling operation, a wireless connection is automatically established between the elevator control apparatus and the wrist-wearable smart device.

The elevator control apparatus according to an embodiment of the present invention, wherein the elevator control apparatus further comprises a passenger physical status detection module which acquires, at least according to biological characteristic information from a biological characteristic information collection module of the wrist-wearable smart device, physical status information about the corresponding passenger, so as to judge whether to initiate the corresponding special service.

In one embodiment, the passenger physical status detection module is further configured to judge, according to the physical status information about the passenger, whether the passenger has diseases that need rescue, and automatically initiate the special service triggering a rescue service request when it is judged to be "yes".

In one embodiment, the passenger physical status detection module is further configured to acquire or receive other motion information collected by the wrist-wearable smart device apart from the elevator calling motion information, and judge, based on the other motion information, whether the corresponding passenger has the diseases that need rescue.

In one embodiment, the passenger identity recognition module is further configured to acquire or receive the biological characteristic information collected by the wrist-wearable smart device and perform, based on the biological characteristic information, identity authentication on the recognized passenger identity information.

According to another aspect of the present invention, a wrist-wearable smart device is provided, configured to be capable of establishing a wireless connection with an elevator control apparatus;

the wrist-wearable smart device comprising:

an identity identification module which stores identity identification information about a passenger; and a motion sensor which is used for acquiring elevator calling motion information about the passenger performing an elevator calling operation;

wherein the wrist-wearable smart device is configured to transmit the elevator calling motion information, in association with the identity identification information, to the elevator control apparatus.

The wrist-wearable smart device according to an embodiment of the present invention, wherein the wrist-wearable smart device further comprises a biological characteristic information collection module which is used for collecting biological characteristic information about the passenger.

Specifically, the biological characteristic information comprises heart rate, blood pressure, body temperature, oxygen content of blood and/or vein distribution characteristic information.

The wrist-wearable smart device according to an embodiment of the present invention, wherein the wrist-wearable smart device is a smart band.

The wrist-wearable smart device according to an embodiment of the present invention, wherein the motion sensor comprises an acceleration sensor and/or a gyroscope.

According to another aspect of the present invention, an elevator calling operation method is provided, the method comprising the steps of:

acquiring, by a wrist-wearable smart device carried by a passenger, identity identification information about the passenger and elevator calling motion information about the passenger performing an elevator calling operation;

transmitting the elevator calling motion information, in association with the identity identification information, to an elevator control apparatus;

recognizing passenger identity information at least according to the identity identification information; and recognizing the elevator calling operation of the passenger based on the elevator calling motion information, and making an elevator calling request for the elevator calling operation correspond to the recognized passenger identity information.

The elevator calling operation method according to an embodiment of the present invention, wherein the method further comprises the steps of:

determining, according to the elevator calling motion information from the motion sensor, the number of times of an elevator calling operation by the same passenger; and ignoring, according to the number of times of the elevator calling operation, unnecessary elevator calling requests of the passenger.

In one embodiment, the elevator calling operation method further comprises the step of:

determining, according to the elevator calling motion information from the motion sensor, the number of times of an elevator calling operation by the same passenger, and judging, according to the number of times of the elevator calling operation, whether to provide a special dispatch service.

The elevator calling operation method according to an embodiment of the present invention, wherein when the passenger performs an elevator calling operation, a wireless connection is automatically established between the wrist-wearable smart device and the elevator control apparatus.

The elevator calling operation method according to an embodiment of the present invention, wherein the method further comprises the step of: judging, based on the identity identification information or passenger identity information, whether to authorize the passenger to make an elevator calling request.

The elevator calling operation method according to an embodiment of the present invention, wherein the method further comprises the step of: judging, based on passenger identity information in an elevator calling request corresponding to the recognized passenger, whether to provide the passenger with a customized dispatch service.

The elevator calling operation method according to an embodiment of the present invention, wherein the method further comprises the step of: collecting biological characteristic information about the passenger by the wrist-wearable smart device carried by the passenger.

The elevator calling operation method according to an embodiment of the present invention, wherein the method further comprises the step of: acquiring, at least according to the biological characteristic information from a biological characteristic information collection module, physical status information about the corresponding passenger, so as to judge whether to initiate the corresponding special service.

In one embodiment, in the step of acquiring physical status information about the corresponding passenger, it is judged, at least according to the physical status information about the passenger, whether the passenger has diseases that need rescue, and the special service triggering a rescue service request is automatically initiated when it is judged to be "yes".

In one embodiment, other motion information from the wrist-wearable smart device apart from the elevator calling motion information is acquired or received, and it is judged, based on the other motion information, whether the corresponding passenger has the diseases that need rescue.

The elevator calling operation method according to an embodiment of the present invention, wherein the method further comprises the step of: performing, based on the biological characteristic information, identity authentication on the recognized passenger.

The present invention can achieve more convenient and faster elevator calling operations and is capable of recognizing which passenger initiates an elevator calling request for an elevator calling operation, which significantly helps to improve the intelligence degree of the elevator calling operation and has good passenger experience.

BRIEF DESCRIPTION OF THE ACCOMPANYING DRAWINGS

The following detailed description in conjunction with the accompanying drawings explains the above and other objectives and advantages of the present invention more completely and clearly, wherein the same or similar elements are denoted by the same reference numerals.

DETAILED DESCRIPTION

The present invention will now be fully described with reference of the accompanying drawings, and exemplary embodiments of the present invention are shown in the accompanying drawings. The present invention may, however, be implemented in many different forms and should not be construed as being limited to the embodiments set forth herein. Rather, these embodiments are provided so that this disclosure will become thorough and complete, and will fully convey the concept of the present invention to a person skilled in the art.

The block diagrams shown in the accompanying drawings are function entities, and do not necessarily have to correspond to physically or logically independent entities. These function entities may be implemented in a form of software, or these function entities may be implemented in one or more hardware modules or integrated circuits, or these function entities may be implemented in different networks and/or processor devices and/or microcontroller devices.

In this context, the "elevator calling operation" comprises the operation of inputting a destination floor location by a passenger outside an elevator car, and also comprises the operation of inputting the destination floor location by a passenger inside the elevator car, and the operations are generally completed by pushing buttons with fingers. The destination floor location indicates a floor where the passenger needs to reach by taking the elevator.

Figure 1:
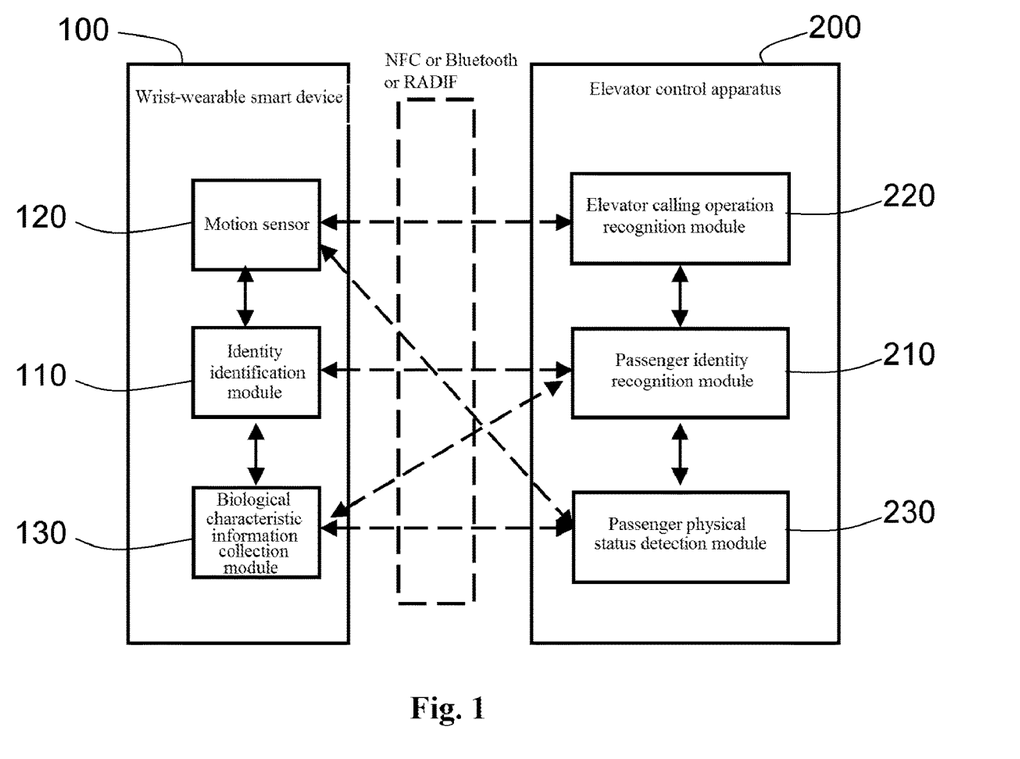
FIG. 1 is a structural block diagram of an elevator calling operation system according to an embodiment of the present invention.

FIG. 1 shows a structural block diagram of an elevator calling operation system according to an embodiment of the present invention. As shown in FIG. 1, the elevator calling operation system 10 comprises a wrist-wearable smart device 100 worn at a passenger end and an elevator control apparatus 200 at an elevator end, wherein the wrist-wearable smart device 100 may be any smart device, such as a smart band or smart watch, that can be worn at a passenger's wrist or any place near the wrist. A wireless connection is established between the wrist-wearable smart device 100 worn at the passenger end and the elevator control apparatus 200 at the elevator end, so as to facilitate information exchange with each other. In one embodiment, a wireless communication module, such as a Bluetooth module or NFC (near field communication) module or radio-frequency communication (RADIF) module, is provided in each of the wrist-wearable smart device 100 and the elevator control apparatus 200 at the elevator end, and accordingly, a wireless connection can be established by, but not limited to, Bluetooth or near field communication or RADIF between the elevator control apparatus 200 and the wrist-wearable smart device 100, and in this way, at least when a passenger wants to perform an elevator calling operation, the passenger approaches the elevator control apparatus 200 and is within a distance range (such as within one meter) where the wireless connection can be established, and the wireless connection is automatically established between the wrist-wearable smart device 100 and the elevator control apparatus 200.

Continued as shown in FIG. 1, the wrist-wearable smart device 100 is provided with an identity identification module 110 which can store identity identification information, such as a token or string code, representing the passenger, and according to a relationship between the identity identification information and a passenger identity preliminarily registered and based on the identity identification information, it can be judged which passenger owns the wrist-wearable smart device 100.

Correspondingly, the elevator control apparatus 200 is provided with a passenger identity recognition module 210, wherein the passenger identity recognition module 210 can directly or directly acquire the identity identification information from the identity identification module 110 of the wrist-wearable smart device 100, so as to be capable of recognizing, based on the identity identification information, a passenger currently interacting with the elevator control apparatus 200. In one embodiment, the passenger identity recognition module 210 can preliminarily register and store a relationship table between the identity identification information and the passenger identity, and can quickly and correspondingly recognize a passenger based on the stored relationship table, wherein the identity identification information can be actively sent by the identity identification module 110, and can also be actively acquired by the passenger identity recognition module 210 from the identity identification module 110.

Continued as shown in FIG. 1, the wrist-wearable smart device 100 is provided with a motion sensor 120 which can recognize and acquire elevator calling motion information when the passenger performs the elevator calling operation. Generally, the elevator calling motion information has a certain regularity, for example, an elevator calling motion of a passenger performing elevator calling mainly comprising raising the hand, pressing and releasing, and the motion sensor 120 can detect these motions and record the same as the elevator calling motion information. It should be understood that the motion sensor 120 might not be restrictive to acquiring the elevator calling motion information during the elevator calling operation, and can also, for example, acquire other motion information about the passenger's hand, and the motion sensor 120 can recognize and acquire the elevator calling motion information from multiple pieces of motion information according to the regularity characteristics of the elevator calling motion information.

The motion sensor 120 can be, but is not limited to, an acceleration sensor or a gyroscope, etc., and any sensor that can quickly and accurately detect the elevator calling motion information can all be applied to the wrist-wearable smart device 100.

In the embodiment, in the wrist-wearable smart device 100, the elevator calling motion information is transmitted, in association with the identity identification information in the identity identification module 110, for example to the elevator control apparatus 200. In this way, the elevator control apparatus 200 can learn which wrist-wearable smart device 100 correspondingly sends the elevator calling motion information currently received. During the transmission in an association manner, the identity identification information and the elevator calling motion information can be transmitted at the same time or successively.

Correspondingly, the elevator control apparatus 200 is provided with an elevator calling operation recognition module 220, wherein the elevator calling operation recognition module 220 can acquire the elevator calling motion information from the motion sensor 120; meanwhile, the passenger identity recognition module 210 acquires the identity identification information (that is, identity identification information in the identity identification module 110 of the wrist-wearable smart device 100 where the motion sensor 120 is located) which is sent in association with the elevator calling motion information, wherein the identity identification information can be sent to the passenger identity recognition module 210, so that a passenger corresponding to the elevator calling motion information can be recognized; and the elevator calling operation recognition module 220 recognizes an elevator calling operation of the passenger based on the elevator calling motion information, and when one elevator calling operation is detected, it is indicated that the passenger completes one elevator calling operation.

When the passenger completes one elevator calling operation (for example, pressing an elevator calling button), the elevator control apparatus 200 will receive an elevator calling request according to the triggering of the elevator calling button. The elevator control apparatus 200 further makes the elevator calling request corresponding to the elevator calling operation (detected by the elevator calling operation recognition module 220) correspond to recognized passenger identity information (recognized by the passenger identity recognition module 210), that is, associates the elevator calling request with the passenger identity information. In this way, the elevator calling operation recognition module 220 not only can detect the elevator calling operation, but also can recognize which passenger an elevator calling request instruction of the elevator calling operation belongs to. Even it is possible that multiple passengers each wear different wrist-wearable smart devices 100, and are all within a distance range for an automatic wireless connection with the elevator control apparatus 200 and automatically connected with the elevator control apparatus 200, since each piece of elevator calling motion information will be sent together with the identity identification information from the identity identification module 110, the identity of an operating passenger corresponding to the elevator calling motion information is recognized, and which passenger an elevator calling request instruction of the elevator calling operation belongs to can thus be certainly recognized.

The elevator calling operation recognition module 220 can extract, when detecting the elevator calling operation of the passenger based on the elevator calling motion information, hand movement trajectory characteristics, etc. from the elevator calling motion information, and recognize the elevator calling operation of the passenger based on a trajectory characteristics rule of the elevator calling operation.

In one embodiment, the passenger identity recognition module 210 is further configured to judge, based on the identity identification information, whether to authorize the passenger corresponding thereto to make an elevator calling request, that is, the passenger identity recognition module can authorize whether the elevator calling request is allowed to perform. The passenger may perform an elevator calling operation freely; however, if the identity identification information about the passenger fails to pass authentication by the passenger identity recognition module 210, it is indicated that the passenger is not allowed to enter the corresponding floor, and the elevator calling operation is invalid, that is, an elevator calling request for the elevator calling operation is rejected, and a dispatch system of the elevator control apparatus 200 will not respond to the elevator calling request. Therefore, the unauthorized passenger cannot enter the corresponding floor of the building.

In one embodiment, the elevator control apparatus 200 can further provide the passenger with a customized service using passenger information corresponding to the elevator calling request instruction, wherein the elevator control apparatus 200 judges, based on the passenger identity information in the elevator calling request corresponding to the recognized passenger, whether to provide the passenger with a customized dispatch service. For example, if the elevator calling request instruction is initiated by a VIP passenger, the elevator control apparatus 200 can provide the passenger with a VIP customized dispatch service; when the dispatch system of the elevator control apparatus 200 receives the elevator calling request instruction corresponding to the VIP passenger, a dedicated elevator can be assigned to the VIP passenger, wherein the dedicated elevator at least does not accept, on an elevator riding path from an initial floor to a destination floor of the passenger, an elevator calling request with the same elevator riding direction (for example, "upwards" or "downwards") from other passengers going from the initial floor to the destination floor, and in this way, it can be assured that the VIP passenger takes the elevator alone during the elevator riding and reaches the destination floor quickly. Of course, the customized service provided by the elevator control apparatus 200 is not limited to the above illustrative customized dispatch service, and further comprises, for example, assigning different types of elevators, turning on an illumination lamp when the passenger enters the elevator car, displaying greetings to particular users, giving the voice prompt upon arrival (for example, "Hello Mr./Ms. XXX, it is the third floor"), etc. That is to say, the elevator control apparatus 200 can provide the passenger with various pre-set customized services when knowing who sends an elevator calling request command, which helps to improve passenger experience.

Continued as shown in FIG. 1, the wrist-wearable smart device 100 is provided with a biological characteristic information collection module 130, wherein the biological characteristic information collection module 130 can collect biological characteristic information about the passenger regularly or in real time, and the biological characteristic information can be, but is not limited to, heart rate, blood pressure, body temperature and/or oxygen content of blood, etc.; and in consideration of the wrist-wearable smart device 100 further realizing other functions related to the elevator, the types of biological characteristic information collected are not restrictive, and the ways for collection are also not restrictive.

Correspondingly, the elevator control apparatus 200 is provided with a passenger physical status detection module 230 which acquires, at least according to the biological characteristic information from the biological characteristic information collection module 130, physical status information about the corresponding passenger, so as to judge whether to initiate the corresponding special service. In one embodiment, it is judged, according to the physical status information about the passenger, whether the passenger has diseases that need rescue, and a rescue service request is automatically triggered when it is judged to be "yes". In this way, when the passenger is waiting for or taking the elevator, for a seriously ill passenger, there is a quick response to provide a rescue service.

It should be noted that the specific types of the above diseases that need rescue can be, but are not limited to, various diseases that need emergency rescue, such as epilepsy, hypertension and stroke, myocardial infarction and cerebral infarction; the determination methods for the diseases and biological characteristic information required for the determination are set and stored in the passenger physical status detection module 230 in advance; the biological characteristic information collection module 130 keeps collecting these pieces of biological characteristic information required (for example, heart rate, blood pressure, body temperature and oxygen content of blood) and sending the same to the passenger physical status detection module 230; and the passenger physical status detection module 230 dynamically performs disease determination based on these pieces of information and determination methods. The above rescue services can be, but are not limited to, automatically controlling the elevator to take the passenger to the floor where the rescue room is located, sending an alarm signal, etc.

It should be noted that the corresponding special services initiated and provided by the elevator control apparatus 200 are not limited to the above illustrative automatic initiating and triggering of a rescue service request, and specifically, the various corresponding special services that can be provided by an elevator system can be set in advance according to various pieces of physical status information.

In one embodiment, the passenger physical status detection module 230 of the elevator control apparatus 200 can further acquire or receive other motion information, such as the trembling amplitude and frequency of hand movements, collected by the motion sensor 120 of the wrist-wearable smart device 100 apart from the elevator calling motion information, and thus further judge, based on the motion information, whether the corresponding passenger has diseases that need rescue. The disease determination may be more accurate, and there may be more types of diseases that can be determined. For example, with regard to the epilepsy, the disease determination can be performed relatively more accurately based on the motion information collected by the motion sensor 120.

In another embodiment, the biological characteristic information collected by the biological characteristic information collection module 130 of the wrist-wearable smart device 100 can be used, and not limited thereto, determine the diseases of the passenger in the above embodiment, but can be further used to perform identity authentication on the passenger. Specifically, the wrist-wearable smart device 100 acquires or receives the biological characteristic information, such as vein distribution characteristic information, from the biological characteristic information collection module 130; and since vein distribution characteristic information about the wrist of each passenger is distinct and unique, the recognized passenger identity information can be authenticated based on the biological characteristic information, and if the authentication is passed, it is indicated that the passenger carrying the wrist-wearable smart device 100 is the owner of the wrist-wearable smart device 100, instead of other people. After the identity authentication is passed, the passenger identity recognition module 210 authorizes the passenger to make an elevator calling request, otherwise, rejects the elevator calling request of the passenger for the elevator calling operation. In this way, other passengers using the wrist-wearable smart device 100 of the authorized passenger to make an elevator calling request is prevented.

It should be understood that the biological characteristic information used for identity authentication is not limited to the above illustrations, and other distinct and unique biological characteristic information of the passenger can also be used for identity authentication. According to the types of the biological characteristic information, different types of components can be provided in the biological characteristic information collection module 130. Moreover, the above biological characteristic information used for authentication of the passenger identity can be stored in the passenger identity recognition module 210 of the elevator control apparatus 200 during the registration and authentication phase of the wrist-wearable smart device 100.

In another embodiment, the elevator control apparatus 200 can be used to count the number of times of an elevator calling request from a certain floor, for example, count how many people are calling the elevator based on the number of times that an elevator calling request instruction has been sent, and adjust an elevator dispatching operation strategy based on the number of times, for example, adjust the elevator dispatching operation strategy to be a peak time operation strategy if there are too many passengers sending the elevator calling request at the certain floor. The inventor has noted that, in the existing elevator calling operation system, each of elevator calling operations of the passenger is determined as one elevator calling request no matter whether the operations are from the same passenger; however, it is often that the same passenger performs multiple unnecessary elevator calling operations, and thus information about the number of people calling the elevator collected above tends to be inaccurate. Therefore, in an embodiment of the present invention, the elevator calling operation recognition module 220 is configured to determine the number of times of an elevator calling operation of a certain passenger according to the elevator calling motion information from the motion sensor 120, for example, counting each elevator calling operation of the same passenger for the same passenger (since the passenger has been recognized), and ignoring, according to the number of times of the elevator calling operation, unnecessary elevator calling requests of the passenger, for example, taking elevator calling requests corresponding to elevator calling operations when the number of times of the elevator calling operation is greater than one as unnecessary elevator calling requests; the elevator calling operation recognition module 220 automatically ignores or rejects the requests, and in this way, the dispatch system of the elevator control apparatus 200 does not receive the elevator calling request command and can accurately count the actual number of passengers who need to take the elevator.

In another embodiment, when the elevator calling operation recognition module 220 determines the number of times of an elevator calling operation of a certain passenger according to the elevator calling motion information from the motion sensor 120, if the determined number of times of an elevator calling operation of the same passenger is greater than or equal to a pre-set value M (for example, M=10), it is possible that there is an emergency, and an emergency elevator-assigning service is required; and the elevator calling operation recognition module 220 can automatically trigger the provision of the special dispatch service, for example, assigning an elevator in priority to the elevator calling request of the passenger.

In specific use scenarios, if a passenger (for example, security personnel) performs elevator calling operations by frequently pressing a button in an elevator waiting hall, it is indicated that the passenger is in a hurry or has urgent affairs; thus, some adjustments may be made to the elevator assigning priority of the elevator assigning system based on an elevator calling request of the passenger, and the urgency of this person is properly taken care of in software settings of a dispatch system; for example, when the passenger performs ten elevator calling operations in one minute, the elevator calling operation recognition module 220 triggers the provision of the passenger with a dispatch service in priority.

Figure 2:
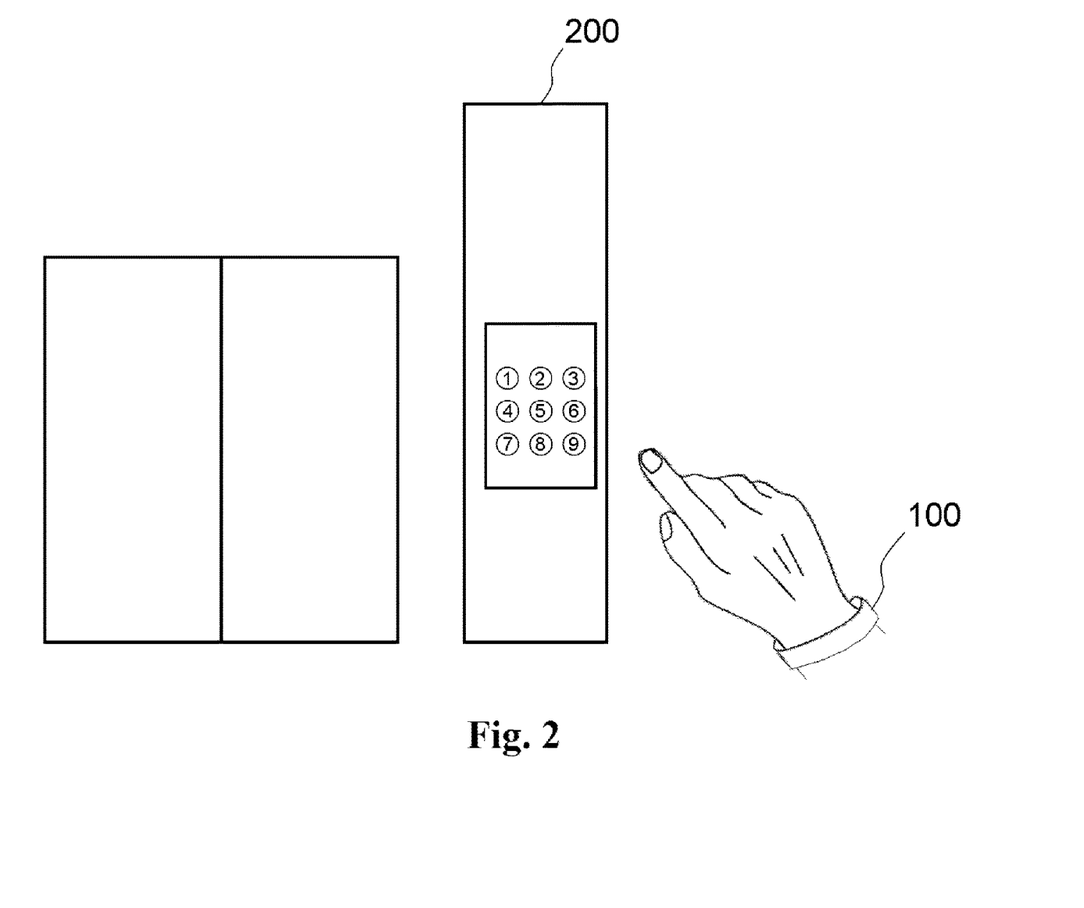
FIG. 2 is a schematic diagram of an elevator calling operation based on a wrist-wearable smart device.

FIG. 2 shows a schematic diagram of an elevator calling operation based on a wrist-wearable smart device. As shown in FIG. 2, when the passenger performs an elevator calling operation, the carried wrist-wearable smart device 100 approaches the elevator control apparatus 200, and accordingly the two can be automatically connected by, for example, NFC, and data is transmitted therebetween. The wrist-wearable smart device 100 can, at the same time, sense an elevator calling motion of an elevator calling operation of the passenger pressing and calling a floor. In one embodiment, in the elevator hall, the elevator calling operation is performed based on the wrist-wearable smart device 100, and a destination floor is input (for example, choosing a button) from the elevator control apparatus 200 of the elevator hall. In another embodiment, in the elevator hall, the wrist-wearable smart device 100 performs the elevator calling operation at the same time, only an elevator calling operation such as "upwards" or "downwards" is input from the elevator control apparatus 200 of the elevator hall, and then, based on the wrist-wearable smart device 100, a destination floor is input (for example, choosing a button) from the elevator control apparatus 200 of the elevator car.

The above elevator calling operation system based on the wrist-wearable smart device can achieve more convenient and faster elevator calling operations and is capable of recognizing which passenger initiates an elevator calling request for an elevator calling operation, and the elevator control apparatus can further perform intelligent dispatch processing.

Figure 3:
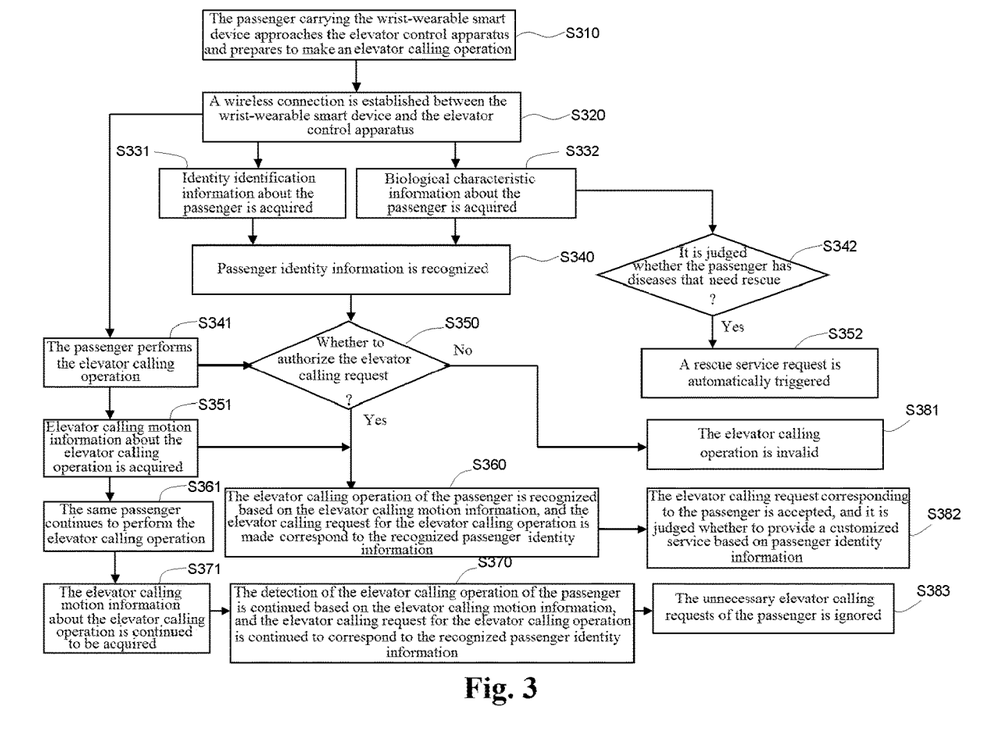
FIG. 3 is a schematic flowchart of an elevator calling operation method according to an embodiment of the present invention.

FIG. 3 shows a schematic flowchart of an elevator calling operation method according to an embodiment of the present invention. FIG. 3 shows a process where a passenger wearing the wrist-wearable smart device 100 performs an elevator calling operation. The process of the elevator calling operation method according to the embodiments of the present invention are described in detail with reference to FIG. 1 to FIG. 3.

Firstly, in step S310, the passenger carrying the wrist-wearable smart device 100 approaches the elevator control apparatus 200 and prepares to make an elevator calling operation. When the wrist-wearable smart device 100 and the elevator control apparatus 200 are close to each other to a certain extent, a wireless connection is automatically established between the wrist-wearable smart device 100 and the elevator control apparatus 200, that is, step S320.

By this time, on the one hand, the passenger performs the elevator calling operation, that is, step S341, and on the other hand, the passenger identity recognition module 210 of the elevator control apparatus 200 acquires identity identification information about the passenger from the identity identification module 110 of the wrist-wearable smart device 100, that is, step S331. In step S332, the identity identification information can be sent, in association with elevator calling motion information acquired in step S351, to the elevator control apparatus 200; furthermore, the passenger identity recognition module 210 and the passenger physical status detection module 230 of the elevator control apparatus 200 continuously or discontinuously acquires biological characteristic information about the passenger from the biological characteristic information collection module 130 of the wrist-wearable smart device 100, that is, step S332.

Furthermore, in step S340, passenger identity information is recognized based on the identity identification information and the biological characteristic information, and in this step, a process where identity authentication is performed on the recognized passenger based on the biological characteristic information is included.

Furthermore, an elevator calling request of the passenger for the elevator calling operation is received, and it is judged whether to authorize the elevator calling request, that is, step S350. In the judging step, whether to authorize the elevator calling request of the passenger for the elevator calling operation is determined depending on whether the passenger identity information is recognized. When it is judged to be "no", then step S381 is entered, the elevator calling operation is invalid, and it is indicated that the current passenger is not an authorized passenger. When it is judged to be "yes", then step S360 is entered.

At the same time, in step S351, the elevator calling motion information about the elevator calling operation is acquired via the motion sensor 120 of the wrist-wearable smart device 100. The elevator calling motion information is sent to the elevator calling operation recognition module 220 of the elevator control apparatus 200, and step S360 is entered; the elevator calling operation of the passenger is recognized based on the elevator calling motion information, and the elevator calling request for the elevator calling operation is made correspond to the recognized passenger, that is, the elevator calling request is associated with the passenger. In this step, the elevator calling request of the passenger can correspond to the passenger identity information, that is, the elevator calling request can comprise the passenger identity information, and accordingly, the elevator control apparatus 200 can recognize which passenger initiates this elevator calling request.

Furthermore, in step S382, the elevator calling request corresponding to the passenger is accepted, and it is judged whether to provide a customized service based on passenger information. In this step, the dispatch system of the elevator control apparatus 200 will accept an elevator calling request instruction of the passenger, and can know which passenger initiates the elevator calling request instruction, and can thus judge whether to provide the passenger with the customized service. For example, if the elevator calling request instruction is initiated by a VIP passenger, the elevator control apparatus 200 can provide the passenger with a VIP service; for example, when the dispatch system of the elevator control apparatus 200 receives the elevator calling request instruction corresponding to the VIP passenger, a dedicated elevator can be assigned to the VIP passenger, wherein the dedicated elevator at least does not accept, on an elevator riding path from an initial floor to a destination floor of the passenger, an elevator calling request with the same elevator riding direction (for example, "upwards" or "downwards") from other passengers going from the initial floor to the destination floor, and in this way, it can be assured that the VIP passenger takes the elevator alone during the elevator riding and reaches the destination floor quickly.

If the passenger continues to perform multiple unnecessary elevator calling operations during the elevator calling operation process, step S361 is entered, that is, the same passenger continues to perform the elevator calling operation. Thus, the motion sensor 120 of the wrist-wearable smart device 100 continues to acquire the elevator calling motion information about the elevator calling operation, that is, step S371. Then, the detection of the elevator calling operation of the passenger is continued based on the elevator calling motion information, and the elevator calling request for the elevator calling operation is continued to correspond to the recognized passenger, that is, step S370. The specific operations of step S371 and step S370 above are the same as those of step S351 and step S360, respectively.

Furthermore, step S383 is entered, and the unnecessary elevator calling requests of the passenger are ignored. In this step, each elevator calling operation of the same passenger is counted for the same passenger (since the passenger has been recognized), and according to the number of times of the elevator calling operation, unnecessary elevator calling requests of the passenger are ignored, for example, when the number of times of the elevator calling operation is greater than one and less than ten, elevator calling requests corresponding to the elevator calling operations when the number of times is greater than one are taken as unnecessary elevator calling requests; the elevator calling operation recognition module 220 automatically ignores the requests, and in this way, the dispatch system of the elevator control apparatus 200 does not receive the elevator calling request command and can accurately count the actual number of passengers who need to take the elevator. In other embodiments, if the number of times of the elevator calling operation is greater than or equal to ten, it is indicated that the passenger is in a hurry or has urgent affairs, and the passenger can be provided with a special dispatch service of priority dispatching.

In this embodiment, the biological characteristic information about the passenger acquired in step S332 can be further used to judge whether the passenger has diseases that need rescue, that is, step S342 is entered, and in this step, the passenger physical status detection module 230 acquires physical status information about the corresponding passenger based on the biological characteristic information such as heart rate and blood pressure, so as to judge whether the corresponding passenger has diseases that need rescue. In other embodiments, whether the corresponding passenger has diseases that need rescue can also be judged in conjunction with or based on other motion information collected by the motion sensor 120 of the wrist-wearable smart device 100 apart from the elevator calling motion information. When it is judged to be "yes", step S352 is entered, and a rescue service request is automatically triggered, so as to perform timely and effective rescue treatment on the passenger. It should be noted that, in other embodiments, in the above step S342 to step S352, the physical status information about the corresponding passenger can also be acquired based on a dispatch service, and it is judged whether to initiate other corresponding special services apart from the service triggering a rescue service request, which are not described with examples one by one.

The above elevator calling operation method process is targeted at one passenger, and with regard to multiple passengers, elevator calling operations are performed based on the same process above and can be performed at the same time. The above elevator calling operation method process is convenient and fast, and has high intelligence.

It is to be understood that when it is said that a component is "connected" or "coupled" to another component, the component can be directly connected or coupled to the other component, or there may be an intermediate component.

The above examples mainly describe the elevator calling operation system of the present invention and the elevator calling operation method therefor, as well as the elevator control apparatus and the wrist-wearable smart device used in the elevator calling operation system. Although only some implementations of the present invention are described, a person of ordinary skill in the art should understand that the present invention can be implemented in many other forms without departing from the spirit and scope of the present invention. Therefore, the examples and implementations shown herein are considered as illustrative and not restrictive, and the present invention may cover various modifications and replacements without departing from the spirit and scope of the present invention as defined by the appended claims.

What is claimed is:

1. An elevator calling operation system comprising:
an elevator control apparatus, and
a wrist-wearable smart device wirelessly connected to the elevator control apparatus;
the wrist-wearable smart device comprising:
an identity identification module which stores identity identification information about a passenger; and
a motion sensor which is used for acquiring elevator calling motion information about the passenger performing an elevator calling operation;
wherein the wrist-wearable smart device is configured to transmit the elevator calling motion information, in association with the identity identification information, to the elevator control apparatus;
and the elevator control apparatus comprising:
a passenger identity recognition module which is used for recognizing passenger identity information at least according to the identity identification information; and
an elevator calling operation recognition module which is used for recognizing an elevator calling operation of the passenger according to the elevator calling motion information from the motion sensor, so as to make an elevator calling request for the elevator calling operation correspond to the recognized passenger identity information;
wherein the elevator calling operation recognition module is further configured to determine, according to the elevator calling motion information from the motion sensor, a number of times of an elevator calling operation by the same passenger, and ignore, according to a number of times of the elevator calling operation, unnecessary elevator calling requests of the passenger.

2. The elevator calling operation system according to claim 1, wherein the elevator calling operation recognition module is further configured to determine, according to the elevator calling motion information from the motion sensor, the number of times of an elevator calling operation by the same passenger, and judge, according to the number of times of the elevator calling operation, whether to provide a special dispatch service.

3. The elevator calling operation system according to claim 2, wherein the elevator calling operation recognition module is further configured to provide the passenger with the special dispatch service of priority dispatching when the number of times of the elevator calling operation by the same passenger is greater than or equal to a certain pre-set value.

4. The elevator calling operation system according to claim 1, wherein the passenger identity recognition module is further configured to judge, based on the identity identification information or passenger identity information, whether to authorize the passenger to make an elevator calling request.

5. The elevator calling operation system according to claim 1, wherein the elevator control apparatus is further configured to judge, based on the recognized passenger identity information, whether to provide the passenger with a customized service.

6. The elevator calling operation system according to claim 5, wherein the customized service comprises assigning a dedicated elevator to the passenger, wherein the dedicated elevator at least does not accept, on an elevator riding path from an initial floor to a destination floor of the passenger, an elevator calling request with the same elevator riding direction from other passengers going from the initial floor to the destination floor.

7. The elevator calling operation system according to claim 1, wherein the elevator control apparatus and the wrist-wearable smart device are wirelessly connected by Bluetooth or near field communication or radio-frequency wireless communication, wherein when the passenger performs an elevator calling operation, a wireless connection is automatically established between the elevator control apparatus and the wrist-wearable smart device.

8. The elevator calling operation system according to claim 1, wherein,
the wrist-wearable smart device further comprises a biological characteristic information collection module which is used for collecting biological characteristic information about the passenger; and
the elevator control apparatus further comprises a passenger physical status detection module which acquires, at least according to the biological characteristic information from the biological characteristic information collection module, physical status information about the corresponding passenger, so as to judge whether to initiate a corresponding special service.

9. The elevator calling operation system according to claim 8, wherein the passenger physical status detection module is further configured to judge, at least according to the physical status information about the passenger, whether the passenger has diseases that need rescue, and automatically initiate the special service triggering a rescue service request when it is judged to be "yes".

10. The elevator calling operation system according to claim 9, wherein the passenger physical status detection module is further configured to acquire or receive other motion information collected by the motion sensor apart from the elevator calling motion information, and judge, based on the other motion information, whether the corresponding passenger has the diseases that need rescue.

11. The elevator calling operation system according to claim 8, wherein the passenger identity recognition module is further configured to acquire or receive the biological characteristic information collected by the biological characteristic information collection module and perform, based on the biological characteristic information, identity authentication on the recognized passenger identity information.

12. The elevator calling operation system according to claim 8, wherein the biological characteristic information comprises heart rate, blood pressure, body temperature, oxygen content of blood and/or vein distribution characteristic information.

13. The elevator calling operation system according to claim 1, wherein the wrist-wearable smart device is a smart band.

14. The elevator calling operation system according to claim 1, wherein the motion sensor comprises an acceleration sensor and/or a gyroscope.

15. An elevator control apparatus configured to establish a wireless connection with a wrist-wearable smart device worn by a passenger, and acquire or receive identity identification information about the passenger, in association with elevator calling motion information when the passenger performs an elevator calling operation, from the wrist-wearable smart device;
wherein the elevator control apparatus comprises:
a passenger identity recognition module which is used for recognizing passenger identity information at least according to the identity identification information; and
an elevator calling operation recognition module which is used for recognizing an elevator calling operation of the passenger according to the elevator calling motion information, so as to make an elevator calling request for the elevator calling operation correspond to the recognized passenger identity information;
wherein the elevator calling operation recognition module is further configured to determine, according to the elevator calling motion information, a number of times of an elevator calling operation by the same passenger, and ignore, according to the number of times of the elevator calling operation, unnecessary elevator calling requests of the passenger.

16. The elevator control apparatus according to claim 15, wherein the elevator calling operation recognition module is further configured to determine, according to the elevator calling motion information, the number of times of an elevator calling operation by the same passenger, and judge, according to the number of times of the elevator calling operation, whether to provide a special dispatch service.

17. The elevator control apparatus according to claim 16, wherein the elevator calling operation recognition module is further configured to provide the passenger with the special dispatch service of priority dispatching when the number of times of the elevator calling operation by the same passenger is greater than or equal to a certain pre-set value.

18. The elevator control apparatus according to claim 15, wherein the passenger identity recognition module is further configured to judge, based on the identity identification information or passenger identity information, whether to authorize the passenger to make an elevator calling request.

19. The elevator control apparatus according to claim 15, wherein the elevator control apparatus is further configured to judge, based on passenger information in an elevator calling request corresponding to a recognized passenger, whether to provide the passenger with a customized service.

20. The elevator control apparatus according to claim 19, wherein the customized service comprises assigning a dedicated elevator to the passenger, wherein the dedicated elevator at least does not accept, on an elevator riding path from an initial floor to a destination floor of the passenger, an elevator calling request with the same elevator riding direction from other passengers going from the initial floor to the destination floor.

21. The elevator control apparatus according to claim 15, wherein the elevator control apparatus and the wrist-wearable smart device are wirelessly connected by Bluetooth or near field communication or radio-frequency wireless communication, wherein when the passenger performs an elevator calling operation, a wireless connection is automatically established between the elevator control apparatus and the wrist-wearable smart device.

22. The elevator control apparatus according to claim 15, wherein the elevator control apparatus further comprises a passenger physical status detection module which acquires, at least according to biological characteristic information from a biological characteristic information collection module of the wrist-wearable smart device, physical status information about the corresponding passenger, so as to judge whether to initiate a corresponding special service.

23. The elevator control apparatus according to claim 22, wherein the passenger physical status detection module is further configured to judge, according to the physical status information about the passenger, whether the passenger has diseases that need rescue, and automatically initiate the special service triggering a rescue service request when it is judged to be "yes".

24. The elevator control apparatus according to claim 23, wherein the passenger physical status detection module is further configured to acquire or receive other motion information collected by the wrist-wearable smart device apart from the elevator calling motion information, and judge, based on the other motion information, whether the corresponding passenger has the diseases that need rescue.

25. The elevator control apparatus according to claim 22, wherein the passenger identity recognition module is further configured to acquire or receive the biological characteristic information collected by the wrist-wearable smart device and perform, based on the biological characteristic information, identity authentication on the recognized passenger identity information.

26. An elevator calling operation method comprising:
acquiring, by a wrist-wearable smart device carried by a passenger, identity identification information about the passenger and elevator calling motion information about the passenger performing an elevator calling operation;

transmitting the elevator calling motion information, in association with the identity identification information, to an elevator control apparatus;

recognizing passenger identity information at least according to the identity identification information;

recognizing the elevator calling operation of the passenger based on the elevator calling motion information, and making an elevator calling request for the elevator calling operation correspond to the recognized passenger identity information;

determining, according to the elevator calling motion information from the wrist-wearable smart device, a number of times of an elevator calling operation by the same passenger; and ignoring, according to the number of times of the elevator calling operation, unnecessary elevator calling requests of the passenger.

27. The method according to claim 26, further comprising:

determining, according to the elevator calling motion information from the wrist-wearable smart device, the number of times of an elevator calling operation by the same passenger, and judging, according to the number of times of the elevator calling operation, whether to provide a special dispatch service.

28. The method according to claim 26, wherein when the passenger performs an elevator calling operation, a wireless connection is automatically established between the wrist-wearable smart device and the elevator control apparatus.

29. The method according to claim 26, further comprising: judging, based on the identity identification information or passenger identity information, whether to authorize the passenger to make an elevator calling request.

30. The method according to claim 26, further comprising: judging, based on passenger identity information in an elevator calling request corresponding to a recognized passenger, whether to provide the passenger with a customized dispatch service.

31. The method according to claim 26, further comprising: collecting biological characteristic information about the passenger by the wrist-wearable smart device carried by the passenger.

32. The method according to claim 31, further comprising: acquiring, at least according to the biological characteristic information from a biological characteristic information collection module, physical status information about the corresponding passenger, so as to judge whether to initiate a corresponding special service.

33. The method according to claim 32, wherein the acquiring physical status information about the corresponding passenger, judging, at least according to the physical status information about the passenger, whether the passenger has diseases that need rescue, and automatically initiating the special service triggering a rescue service request when it is judged to be "yes".

34. The method according to claim 33, comprising acquiring or receiving other motion information from the wrist-wearable smart device apart from the elevator calling motion information, and judging, based on the other motion information, whether the corresponding passenger has the diseases that need rescue.

35. The method according to claim 31, further comprising: performing, based on the biological characteristic information, identity authentication on a recognized passenger.

* * * * *